United States Patent
Risse et al.

(10) Patent No.: US 9,022,404 B2
(45) Date of Patent: May 5, 2015

(54) METHOD AND DEVICE FOR ADJUSTING THE SUPPORTING LOAD OF A CENTRAL AXLE TRAILER

(71) Applicant: WABCO GmbH, Hannover (DE)

(72) Inventors: Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 1 day.

(21) Appl. No.: 13/652,953

(22) Filed: Oct. 16, 2012

(65) Prior Publication Data

US 2013/0119637 A1    May 16, 2013

(30) Foreign Application Priority Data

Nov. 10, 2011  (DE) .......................... 10 2011 118 167

(51) Int. Cl.
| | |
|---|---|
| *B60G 17/015* | (2006.01) |
| *B60G 17/00* | (2006.01) |
| *B60G 17/052* | (2006.01) |
| *B60G 17/018* | (2006.01) |
| *B60G 5/04* | (2006.01) |

(52) U.S. Cl.
CPC .......... *B60G 17/052* (2013.01); *B60G 17/0155* (2013.01); *B60G 17/018* (2013.01); *B60G 2202/152* (2013.01); *B60G 2300/0262* (2013.01); *B60G 2300/042* (2013.01); *B60G 2400/51222* (2013.01); *B60G 2400/61* (2013.01); *B60G 2400/97* (2013.01); *B60G 2500/20* (2013.01); *B60G 2500/2014* (2013.01); *B60G 2500/22* (2013.01); *B60G 2800/915* (2013.01); *B60G 5/04* (2013.01)

(58) Field of Classification Search
CPC .... B60G 17/0155; B60G 17/052; B60G 5/00; B60G 5/01; B60G 5/04
USPC .......... 280/5.504, 5.514, 5.515, 6.157, 6.159, 280/86.5, 124.101, 124.11, 124.157, 280/124.16, 678, 683; 180/41, 209
See application file for complete search history.

(56) References Cited

U.S. PATENT DOCUMENTS 2,691,420 A * 10/1954 Fox et al. .......................... 180/22
3,390,895 A *  7/1968 Verdi ............................ 280/86.5
(Continued)

FOREIGN PATENT DOCUMENTS

| DE | 197 07 210 A1 | 8/1998 |
|---|---|---|
| DE | 197 18 258 A1 | 11/1998 |

(Continued)

*Primary Examiner* — Paul N Dickson
*Assistant Examiner* — Barry Gooden, Jr.
(74) *Attorney, Agent, or Firm* — Kramer Levin Naftalis & Frankel LLP

(57) ABSTRACT

For adjusting the supporting load of a central axle trailer equipped with at least two axles having pneumatic suspensions and a pneumatic suspension system that includes separate pneumatic suspension circuits on the axles with pneumatic suspensions, a method and electronic control device are provided by which the respective quantities of air are separately adjustable. When the current supporting load exceeds a permitted supporting load range, the current supporting load is reduced by separate alteration of the quantity of air in at least one of the pneumatic suspension circuits; and, when the current supporting load is below the permitted supporting load range, the current supporting load is increased by separate alteration of the quantity of air in at least one of the pneumatic suspension circuits.

11 Claims, 4 Drawing Sheets

(56) References Cited

U.S. PATENT DOCUMENTS

| | | | |
|---|---|---|---|
| 3,494,632 A * | 2/1970 | Bostrom | 280/683 |
| 3,940,167 A * | 2/1976 | Pilz | 280/415.1 |
| 4,103,752 A * | 8/1978 | Schmidt | 177/141 |
| 4,649,369 A * | 3/1987 | Walker et al. | 340/438 |
| 4,944,526 A * | 7/1990 | Eberling | 280/86.5 |
| 5,035,439 A * | 7/1991 | Petrillo | 280/81.6 |
| 6,240,339 B1 | 5/2001 | von Mayenburg et al. | 701/1 |
| 6,572,124 B2 * | 6/2003 | Mlsna et al. | 280/86.5 |
| 6,829,943 B2 * | 12/2004 | Weyand et al. | 73/760 |
| 6,921,100 B2 * | 7/2005 | Mantini et al. | 280/407 |
| 7,000,978 B1 * | 2/2006 | Messano | 296/181.6 |
| 7,072,763 B2 * | 7/2006 | Saxon et al. | 701/124 |
| 7,572,988 B1 * | 8/2009 | Morton et al. | 177/137 |
| 7,735,516 B2 * | 6/2010 | Morris | 137/596.15 |
| 7,872,988 B1 * | 1/2011 | Hatley et al. | 370/252 |
| 8,348,297 B2 * | 1/2013 | Gruber et al. | 280/438.1 |
| 2001/0007234 A1 * | 7/2001 | Scheetz | 111/186 |
| 2002/0180172 A1 * | 12/2002 | Gottschalk et al. | 280/124.157 |
| 2003/0050749 A1 * | 3/2003 | Cervantez et al. | 701/49 |
| 2003/0111810 A1 * | 6/2003 | Fulton et al. | 280/86.5 |
| 2003/0154798 A1 * | 8/2003 | Weyand et al. | 73/760 |
| 2003/0155164 A1 * | 8/2003 | Mantini et al. | 180/209 |
| 2004/0178005 A1 * | 9/2004 | Carlstrom et al. | 177/139 |
| 2005/0173892 A1 * | 8/2005 | Terminello | 280/490.1 |
| 2007/0290461 A1 * | 12/2007 | Oscarsson | 280/6.15 |
| 2009/0024285 A1 * | 1/2009 | Snyder | 701/48 |
| 2009/0069951 A1 * | 3/2009 | Liljeblad et al. | 701/1 |
| 2010/0194143 A1 * | 8/2010 | Perkins et al. | 296/180.2 |
| 2011/0049837 A1 * | 3/2011 | Hapyuk et al. | 280/407 |
| 2013/0079980 A1 * | 3/2013 | Vuk et al. | 701/36 |
| 2013/0080078 A1 * | 3/2013 | Wirthlin | 702/42 |
| 2013/0140784 A1 * | 6/2013 | Ehrlich | 280/124.159 |
| 2013/0253814 A1 * | 9/2013 | Wirthlin | 701/124 |

FOREIGN PATENT DOCUMENTS

| | | |
|---|---|---|
| DE | 10 2004 003 023 A1 | 8/2005 |
| DE | 10 2008 003 206 | 7/2009 |
| DE | 10 2010 037 700 A1 | 3/2012 |

* cited by examiner

METHOD AND DEVICE FOR ADJUSTING THE SUPPORTING LOAD OF A CENTRAL AXLE TRAILER

CROSS-REFERENCE TO RELATED APPLICATION

This application claims the benefit of DE 10 2011 118 167.2 filed on Nov. 10, 2011, the disclosure of which is hereby incorporated herein by reference in its entirety.

FIELD OF THE INVENTION

The present invention generally relates to embodiments of a method and electronic control device for adjusting the supporting load of a central axle trailer.

BACKGROUND OF THE INVENTION

Trailer vehicles can be central axle trailers in which the vehicle axles are arranged centrally relative to the longitudinal direction of the trailer vehicle, i.e., approximately centrally relative to the longitudinal extent of the loading surface. Central axle trailers exist in embodiments with a single central vehicle axle or a plurality of vehicle axles, for example two or three axles, which are arranged relatively closely to one another and centrally relative to the longitudinal extent of the loading surface. In contrast to a semitrailer, a central axle trailer is not configured for coupling to a semitrailer truck, but comprises a trailer coupling via which it may be coupled to a coupling device of a truck configured as a counter-piece. Due to the central arrangement of the vehicle axles, care has to be taken regarding suitable load distribution so that the supporting load on the trailer coupling does not become too great or too small. Each time the load of the central axle trailer is altered, care has to be taken regarding suitable load distribution, which, in commercial utility vehicles means that, in practice, after altering the load, the supporting load has to be measured and optionally the load distribution is altered.

A supporting load that is too small may result in unstable driving behavior of the tractor vehicle or the entire tractor/trailer combination. A supporting load that is too great may lead to overloading of the tractor vehicle, in particular the rear chassis structure. In the field of commercial utility vehicles, the legal supporting load range in some jurisdictions can be 0.5 to 2 tons.

SUMMARY OF THE INVENTION

Generally speaking, it is an object of the present invention to provide a method and electronic control device for adjusting the supporting load of a central axle trailer that permits safe vehicle operation even when the load on the central axle trailer frequently changes.

According to inventive embodiments, a method for adjusting the supporting load of a central axle trailer equipped with at least two axles with pneumatic suspensions and a pneumatic suspension system, which comprises separate pneumatic suspension circuits on the at least two axles with pneumatic suspensions, includes adjusting the respective quantities of air separately from one another based on a determination as to whether the current supporting load is outside a permitted supporting load range. When the current supporting load exceeds the permitted supporting load range, the current supporting load is reduced by separate alteration of the quantity of air in at least one of the pneumatic suspension circuits on the axle; and when the current supporting load is below the permitted supporting load range, the current supporting load is increased by separate alteration of the quantity of air in at least one of the pneumatic suspension circuits on the axle.

Accordingly, the pneumatic suspension system for at least two axles permits the separate adjustment on the axles of the respective quantities of air—making it possible to increase or reduce the pressure of each axle or set of axles relative to the other axle(s). It should be appreciated that this was not possible in conventional central axle trailers. If the central axle trailers were even provided with a pneumatic suspension system, the pneumatic suspension bellows were connected together to form a single pneumatic suspension circuit, so that separate adjustment of the quantities of air on the axle was not possible and/or where a lifting axle or drive axle was used, the pressure of the axle could only be reduced.

According to one embodiment of the present invention, if it is determined that the current supporting load of the central axle trailer is outside a permitted supporting load range, separate alteration to the quantity of air is carried out in at least one of the pneumatic suspension circuits on the axle, i.e., for adapting the supporting load, use is made of the possibility of separate adjustment of the quantities of air in the pneumatic suspension circuits on the axle. The permitted supporting load range can be a range limited by an upper and lower limit value, or a range that is open-ended on one side. Thus, the permitted supporting load range may include, for example, the range of all positive values of the supporting load including the value zero, i.e., values outside the permitted supporting load range are thus negative values. In this case, positive values of the supporting load are understood to be values when the trailer coupling is pulled in the direction of the roadway.

The permitted supporting load range can also be a permitted range specified by the manufacturer of the central axle trailer or the tractor vehicle, or a permitted supporting load range set by law, for example the permitted range applicable in the EU of 0.5 to 2 tons.

To establish whether the current supporting load is outside a permitted supporting load range, the current supporting load on the trailer coupling can be measured, for example by a force sensor. Establishing whether the current supporting load is outside the permitted supporting load range and the optional alteration of the quantity of air in at least one of the pneumatic suspension circuits can be carried out automatically, for example, by an electronic control device. The electronic control device can, for example, be an electronically controlled pneumatic suspension system or an electronically controlled braking system of the central axle trailer. To alter the quantity of air in at least one of the pneumatic suspension circuits, the electronic control device can be connected to an electrically actuatable pneumatic valve device. By activating the valve device by means of the electronic control device, the quantity of air can be correspondingly altered by air being filled into pneumatic suspension bellows from a storage tank, or by air being blown out of the pneumatic suspension bellows.

To establish automatically whether the current supporting load is outside a permitted supporting load range, the electronic control device can be connected to one or more corresponding sensors, for example to a force sensor arranged on the trailer coupling, by which the supporting load may be measured.

According to another embodiment of the present invention, by means of the axle loads of the at least two axles with pneumatic suspension, a determination is made as to whether the current supporting load is outside a permitted supporting load range, and then optionally a corresponding alteration of the quantity of air is carried out in at least one of the pneumatic suspension circuits. The axle loads can be determined by the electronic control device, for example via axle load sensors. In the case of a pneumatic suspension system, the axle loads can also be determined via air pressure sensors connected to the respective pneumatic suspension bellows, by additionally taking into account geometric data of the pneumatic suspension bellows and the axle suspension. A separate axle load sensor or an air pressure sensor need not be provided for each axle to be measured with regard to axle load. In order to determine the axle loads on such axles not provided with sensors, the brake slip on the axles can be monitored, for example when the central axle trailer is braked. If there is a differential value between the brake slip values of the axles, the axle load of an axle not provided with sensors can be calculated via this differential value by utilizing an axle load of another axle detected by a sensor (see, e.g., DE 197 07 210 B4 and DE 10 2008 003 206 A1).

As already mentioned, from the axle loads of the at least two axles it can be established whether the current supporting load is outside a permitted supporting load range. By means of the axle loads, with correspondingly accurate axle load detection and knowledge of further geometric vehicle data, the supporting load present can be calculated directly. However, it should be understood that direct calculation of the supporting load is not a requirement for implementing the present invention. An approximate estimation of the supporting load can be used. Thus, a comparison of whether the axle load of the front axle of the two axles is smaller than the axle load of the rear axle of the two axles already permits the conclusion to be made that the supporting load is outside a permitted supporting load range, as with a central axle trailer a positive supporting load is always desired, and thus the axle load of the front axle always has to be greater than the axle load of the rear axle. Thus, an increase in the supporting load can already be initiated by a separate alteration of the quantity of air in at least one of the pneumatic suspension circuits on the axle.

According to a further embodiment of the present invention, if the current supporting load is outside the permitted supporting load range, the current supporting load is adapted by separate alteration of the quantity of air in at least one of the pneumatic suspension circuits on the axle until the current supporting load is within the permitted supporting load range. The adaptation of the supporting load in this case can be terminated when the permitted supporting load range is reached or continued, for example, approximately until the middle of the permitted supporting load range is reached.

Limits determined by disadvantageous loading of the central axle trailer or by limit values for permitted axle loads may be set for adapting the current supporting load by separate alteration of the quantity of air in at least one of the pneumatic suspension circuits on the axle. In some cases, it may arise that the current supporting load is not able to be altered until it is within the permitted supporting load range, by altering the quantity of air in at least one of the pneumatic suspension circuits. In this case, the supporting load is altered sufficiently until it comes at least as close as possible to the permitted supporting load range.

According to a still further embodiment, if the current supporting load is outside the permitted supporting load range, the current supporting load is adapted by separate alteration of the quantity of air in at least one of the pneumatic suspension circuits on the axle, until on at least one axle the permitted limit load value is reached. This has the advantage that permitted limit values for the axle loads are not exceeded and thus the central axle trailer, the tires and the roadway are protected.

According to yet another embodiment, the alteration of the quantity of air in at least one of the pneumatic suspension circuits is automatically carried out by an electronic control device by activating at least one electrically actuatable pneumatic valve device. The electrically actuatable pneumatic valve device can be a common valve device, for example a dual-circuit construction if two separate pneumatic suspension circuits have to be controlled, or a multi-circuit construction in a pneumatic suspension system having a plurality of pneumatic suspension circuits. The valve device can also have individual valves for each pneumatic suspension circuit, for example in each case a valve with the functions of maintaining the quantity of air, increasing the quantity of air and reducing the quantity of air in the respective pneumatic suspension circuit.

According to another embodiment of the present invention, the axle loads can be detected by pressure sensors connected to pneumatic suspension bellows of the pneumatic suspension circuits. This has the advantage that the axle loads may be detected in a simple, cost-effective manner with a high degree of accuracy.

According to a further embodiment, when the permitted supporting load range is exceeded, the axle load of a second axle arranged behind the first axle of the central axle trailer is reduced relative to the axle load of the first axle. To this end, for example, the quantity of air in the pneumatic suspension circuit of the second axle can be reduced or the quantity of air in the pneumatic suspension circuit of the first axle can be increased or both. If the pneumatic suspension system has a level control system, i.e., a function of maintaining a desired, constant level of the structure of the central axle trailer, then the level control function is overridden by the aforementioned function of adapting the current supporting load by separate alteration of the quantity of air in at least one of the pneumatic suspension circuits on the axle. An alteration of the quantity of air required by the supporting load in one of the pneumatic suspension circuits would cause an alteration to the level. When the level control function is present, however, this is compensated for by a correspondingly opposing alteration of the quantity of air in the respective other pneumatic suspension circuit. In this case, it is advantageous that, if the permitted supporting load range is exceeded, the first axle forms the reference variable (master) for the level control function and the second axle is simply adjusted therewith (slave).

When the current supporting load falls below the permitted supporting load range, however, it is advantageous if the second axle forms the reference variable for adjusting the level and the first axle is simply adjusted therewith.

If one or more axles are additionally configured as lifting axles, according to an advantageous embodiment of the present invention, the axle lifting device of one or more lifting axles is automatically actuated if the current supporting load is outside the permitted supporting load range. By a corresponding automatic actuation of the axle lifting device of one or more lifting axles, the current supporting load can be influenced to an even greater extent in the desired direction, so as to be finally in the permitted supporting load range or at least in the vicinity thereof. Depending on the desired alteration of the current supporting load, therefore, a lifting axle can be automatically raised or lowered. By raising a lifting axle, an additional torque required by the mass of the lifting axle is produced around the axle remaining on the ground and/or the axles remaining on the ground, which may additionally influence the current supporting load in the desired direction. Thus, for example, for increasing the current supporting load a first, front axle of the central axle trailer can be raised by means of the axle lifting device. For reducing the current supporting load, a second, rear axle of the central axle trailer can be raised by means of the axle lifting device.

The claimed invention also is directed to an electronic control device that is configured to adjust the supporting load of the central axle trailer according to one of the method embodiments set forth above. It is further directed to a pneumatic suspension system (which can be equipped with the electronic control device) designed for the central axle trailer having at least two axles with pneumatic suspension, wherein the pneumatic suspension system has separate pneumatic suspension circuits on the axle by which the respective quantities of air can be adjusted separately from one another. This permits the implementation of additional advantageous functions of the pneumatic suspension system, such as for example the methods set forth above.

An advantageous embodiment of the invention relates to a pneumatic suspension system of the type described above for a central axle trailer comprising more than two axles with pneumatic suspension, wherein the pneumatic suspension system has a smaller number of separate pneumatic suspension circuits on the axle than the number of axles with pneumatic suspension of the central axle trailer. In this case, the pneumatic suspension bellows of a plurality of axles are connected to form a common pneumatic suspension circuit. This permits a particularly cost-effective implementation of the pneumatic suspension system as an individual, separate pneumatic suspension circuit is not required for each axle with pneumatic suspension and thus the number of components required for controlling the quantities of air may be kept low. With a central axle trailer provided with three axles with pneumatic suspension, it is advantageous to connect the pneumatic suspension bellows of the two front axles to form a pneumatic suspension circuit when the central axle trailer is primarily loaded to the rear during operation. If a primarily front loading of the central axle trailer is assumed, it is more advantageous to connect the pneumatic suspension bellows of the two rear axles to form a common pneumatic suspension circuit.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

The present invention is described in greater detail hereinafter with reference to the exemplary embodiments depicted in the accompanying drawings, in which.

DETAILED DESCRIPTION OF THE PREFERRED EMBODIMENTS

Figure 1:
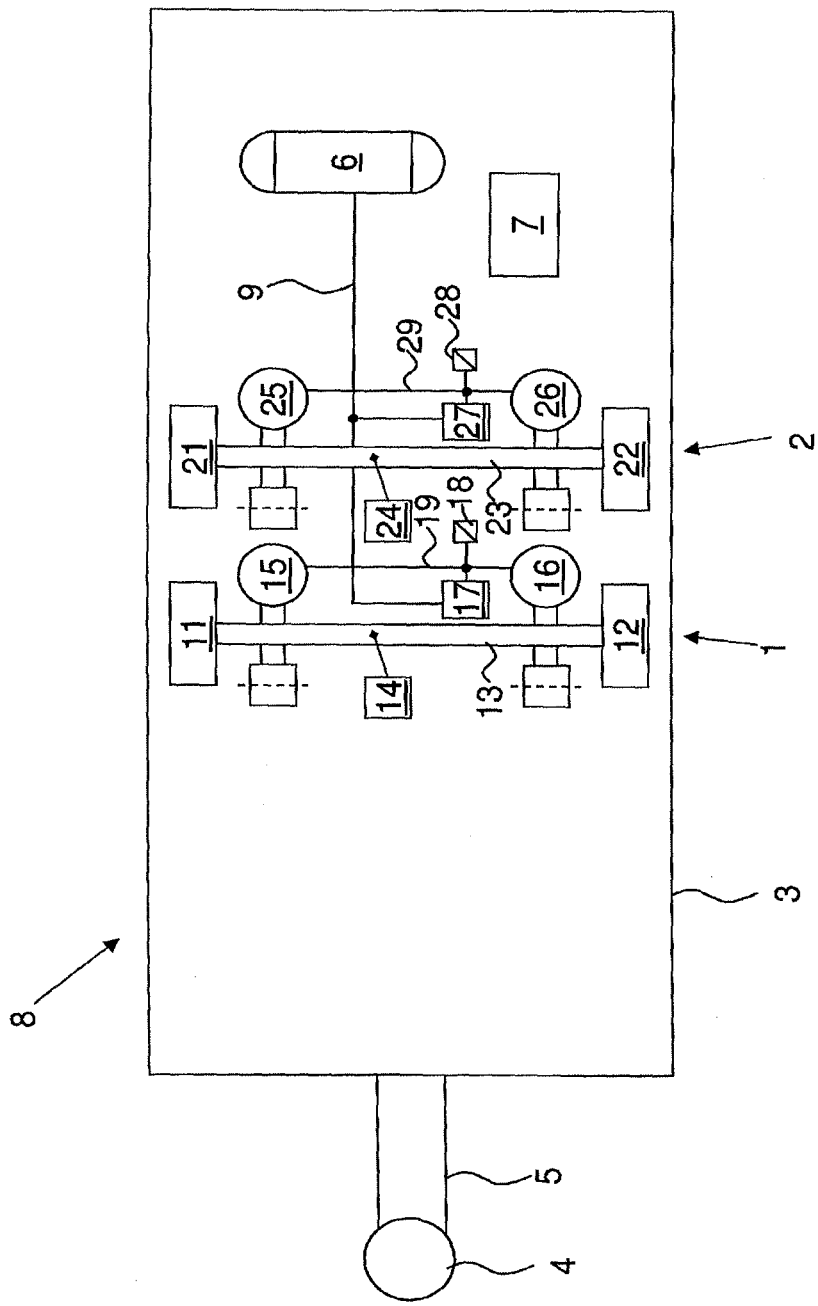
FIG. 1 is a schematic plan view of a dual-axle central axle trailer according to an embodiment of the present invention.

Referring now to the drawing figures, where like reference numerals are used for corresponding elements, FIG. 1 shows a central axle trailer 8 in schematic plan view. The central axle trailer 8 comprises a first front axle 1 with pneumatic suspension and a second rear axle 2 with pneumatic suspension. An "axle" in this sense encompasses the arrangement consisting of one respective axle rod 13, 23 and wheels 11, 12, 21, 22 connected thereto. The first axle 1 is suspended via pneumatic suspension bellows 15, 16 relative to a trailer structure 3. The second axle 2 is suspended via pneumatic suspension bellows 25, 26 relative to the trailer structure 3. The trailer structure 3 of the central axle trailer 8 is provided on the front with a trailer coupling 4 via a coupling rod 5. The central axle trailer 8 is coupled to a tractor vehicle via the trailer coupling 4.

The pneumatic suspension bellows 15, 16 of the first axle 1 are connected together via pneumatic lines 19 and to a first electrically actuatable pneumatic valve device 17, as well as a first pressure sensor 18. As a result, a first pneumatic suspension circuit 15, 16, 17, 18, 19 is formed. The pneumatic suspension bellows 25, 26 of the second axle 2 are connected via pneumatic lines 29 to a second electrically actuatable pneumatic valve device 27, as well as a second pressure sensor 28. As a result, a second pneumatic suspension circuit 25, 26, 27, 28, 29 is formed that is separate from the first pneumatic suspension circuit 15, 16, 17, 18, 19. By separate actuation of the first and the second electrically actuatable pneumatic valve device 17, 27, the quantities of air in the first and in the second pneumatic suspension circuits may be adjusted separately from one another.

The first and the second electrically actuatable pneumatic valve devices 17, 27 are connected via pneumatic lines 9 to a compressed air storage tank 6, which is arranged on the central axle trailer 8. It should be understood that the present invention can also be implemented in central axle trailers without separate compressed air storage tanks. In this case, the compressed air line 9 is connected to a compressed air storage tank of the tractor vehicle. The first and the second electrically actuatable pneumatic valve devices 17, 27 in each case additionally comprise a venting connector via which the compressed air can be discharged into the atmosphere from the respective pneumatic suspension bellows. The electrically actuatable pneumatic valve device 17 and/or 27 has three respective functional positions, namely "maintain quantity of air in pneumatic suspension circuit", "increase quantity of air in pneumatic suspension circuit" and "reduce quantity of air in pneumatic suspension circuit," which can be adjusted in each case separately by electrical actuation of the valve device 17 and/or 27.

The pneumatic suspension system shown in FIG. 1 for carrying out a level control function additionally comprises level detection sensors 14, 24, which may be configured, for example, as path sensors and which detect the respective level of those axles 1, 2 with which the level detection sensors are coupled in each case. The level detection sensors 14, 24, the first and the second electrically actuatable pneumatic valve devices 17, 27 and the first and second pressure sensors 18, 28 are connected via electrical lines, which are not shown in FIG. 1, to an electronic control device 7. The electronic control device 7 carries out, for example, a level control function of the pneumatic suspension system. Additionally, the electronic control device carries out a method for adjusting the supporting load of the central axle trailer 8 as already mentioned.

Figure 2:
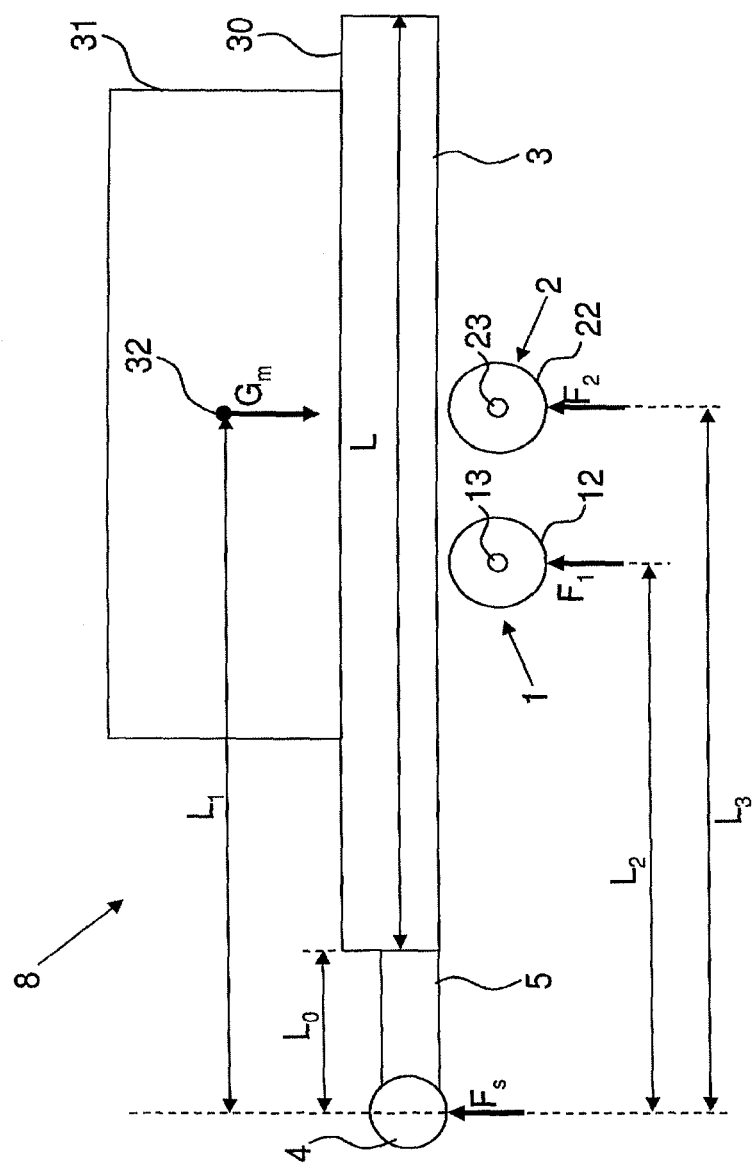
FIG. 2 is a side view of the central axle trailer embodiment depicted in FIG. 1.

FIG. 2 shows the central axle trailer 8 in side view with further details. Visible are wheels 12, 22 of the first and the second vehicle axle 1, 2 fastened to the respective axle rods 13, 23. Also shown is the trailer structure 3 with a loading surface 30. A load 31 is arranged on the loading surface 30. Also visible is the trailer coupling 4 connected via the coupling rod 5 to the trailer structure 3.

In FIG. 2, different geometric dimensions and the forces that are present are indicated. The variables are as follows:

$G_m$ is the weight force occurring as a result of the mass m of the load 31 relative to a center of gravity 32 of the load 31.

$F_s$ is the supporting load on the trailer coupling 4.

$F_1$ is the axle load of the first axle 1.

$F_2$ is the axle load of the second axle 2.

L is the length of loading surface 30 in the longitudinal direction of the central axle trailer 8.

$L_0$ is the spacing of the point of application of the supporting load $F_s$ from the front end of the loading surface 30, which approximately corresponds to the effective length of the coupling rod 5.

$L_1$ is the spacing between the point of application of the supporting load $F_s$ from the center of gravity 32.

$L_2$ is the spacing between the points of application of the supporting load $F_s$ and the axle load $F_1$ of the first axle 1.

$L_3$ is the spacing of the points of application of the supporting load $F_s$ and the axle load $F_2$ of the second axle 2.

The variables L, $L_0$, $L_1$, $L_2$, $L_3$ refer to the spacings to be measured in each case in the longitudinal direction of the central axle trailer 8.

The axle loads $F_1$, $F_2$ can, in this case, be determined from the detected pressure values of the first and the second pressure sensors 18, 28.

The electronic control device 7 can initially compare the axle loads $F_1$, $F_2$ directly with one another to establish whether the current supporting load $F_s$ is outside a permitted supporting range. If the condition $F_1 > F_2$ is not fulfilled, it may be assumed that the current supporting load $F_s$ is outside a permitted supporting load range. In this case, the electronic control device 7 relieves the load from the first axle 1, so as to increase the current supporting load $F_s$ thereby. To this end, the electronic control device 7 may, for example, reduce the quantity of air in the first pneumatic suspension circuit 15, 16, 17, 18, 19 or increase the quantity of air in the second pneumatic suspension circuit 25, 26, 27, 28, 29 or carry out both.

In one embodiment, the electronic control device 7 determines a measurement of the current supporting load $F_s$:

$$F_s = F_1 \cdot \left(\frac{L_2}{L_1} - 1\right) + F_2 \cdot \left(\frac{L_3}{L_1} - 1\right)$$

The electronic control device 7 compares the determined value of the current supporting load $F_s$ with predetermined limit values, which define a permitted supporting load range, for example 0.5 t as the lower limit value and 2 t as the upper limit value. If the supporting load range is not attained, the electronic control device 7 alters the quantity of air in at least one of the pneumatic suspension circuits in the previously described manner in order to bring the current supporting load $F_s$ again into the permitted supporting load range or at least closer thereto.

According to another embodiment, the electronic control device 7 determines the variable $L_1$ at least approximately according to the following relationship:

$$L_1 = L_0 + \frac{L}{2} \cdot \frac{m - m_{empty}}{m_{max}}$$

In this case m is the sum of $F_1$ and $F_2$, divided by the gravitational acceleration g. $m_{leer}$ is the tare weight of the central axle trailer, i.e., the weight in the unloaded state, $m_{max}$ is the permitted maximum weight of the central axle trailer 8. By using this relationship, a good approximation of a value for $L_1$ can be determined, as in practice it may be assumed that a trailer is loaded from front to back and unloaded from back to front.

Figure 3:
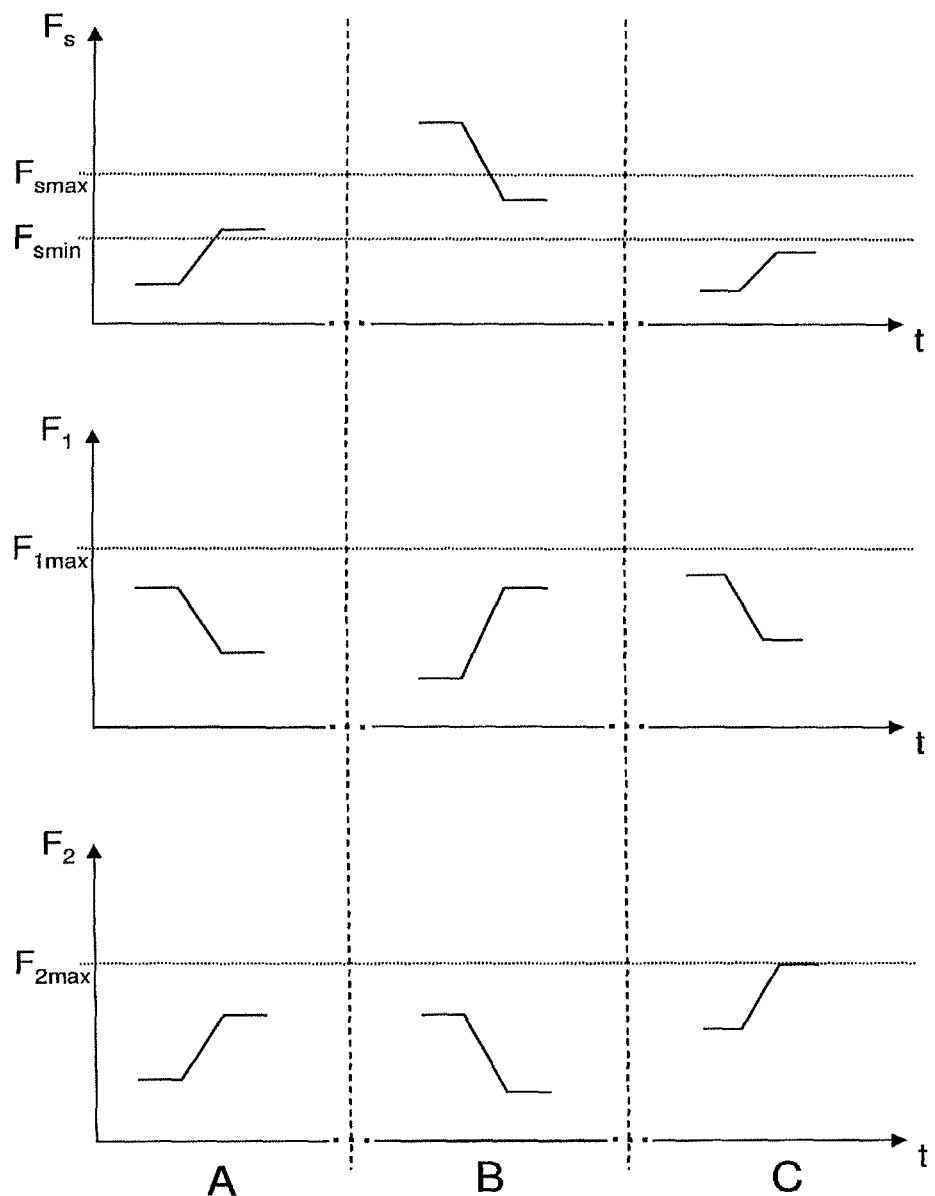
FIG. 3 depicts various force/time diagrams relevant to embodiments of the present invention.

FIG. 3 shows, with reference to three force/time diagrams arranged on top of one another, possible curves of the supporting load $F_s$ (upper diagram), the axle load $F_1$ of the first axle 1 (central diagram) and the axle load $F_2$ of the second axle 2 (lower diagram). The curves are shown for the respective time periods A, B and C, which refer to different cases of adapting to the supporting load.

Relative to the supporting load $F_s$ a permitted supporting load range between a lower limit value $F_{smin}$ and an upper limit value $F_{smax}$ is assumed. The maximum permitted axle load $F_1$ of the first axle 1 in the example shown is $F_{1max}$, and the maximum permitted axle load $F_2$ of the second axle 2 is $F_{2max}$.

In period A the case of falling below the permitted supporting load range is shown, i.e., the supporting load $F_s$ is initially below $F_{smin}$. The electronic control device 7 identifies this and relieves the load from the first axle 1 which in the central diagram in portion A may be identified as the axle load $F_1$ being reduced. This inevitably leads to a greater loading of the second axle 2 as may be seen in the lower diagram. The axle loads $F_1$, $F_2$ are in each case still below the permitted limit value $F_{1max}$, $F_{2max}$. As may be seen in the upper diagram in period A, the supporting load $F_s$ is moved into the permitted range, wherein this is sufficient to exceed the lower limit value $F_{smin}$.

In period B the opposing case is considered, in that the supporting load $F_s$ is initially too high, i.e., above the upper limit value $F_{smax}$. The electronic control device 7 identifies this and relieves the load from the second axle 2, as may be seen in the lower diagram. As a result, the first axle 1 is loaded to a greater extent, as shown in the central diagram in period B. The axle loads $F_1$, $F_2$ are also below the permitted axle load limit values $F_{1max}$, $F_{2max}$. As may be identified in the upper diagram in period B, the supporting load $F_s$ is moved approximately into the middle range of the permitted supporting load range.

In period C, in turn, a case is shown in which the current supporting load $F_s$ is below the permitted supporting load range. Once again the load is relieved from the first axle 1. As may be seen in the lower diagram, this leads to an increase in the axle load $F_2$ of the second axle 2. This increases to such an extent that the maximum permitted axle load $F_{2max}$ is reached. The electronic control device 7 identifies this and then as a result terminates the unloading of the first axle 1. As may be identified in the upper diagram in period C, as a result, the supporting load Fs has been increased and thus is closer to the permitted supporting load range, but does not yet attain said range, as the unloading of the first axle 1 has been prematurely terminated due to an imminent overload of the second axle 2.

Figure 4:
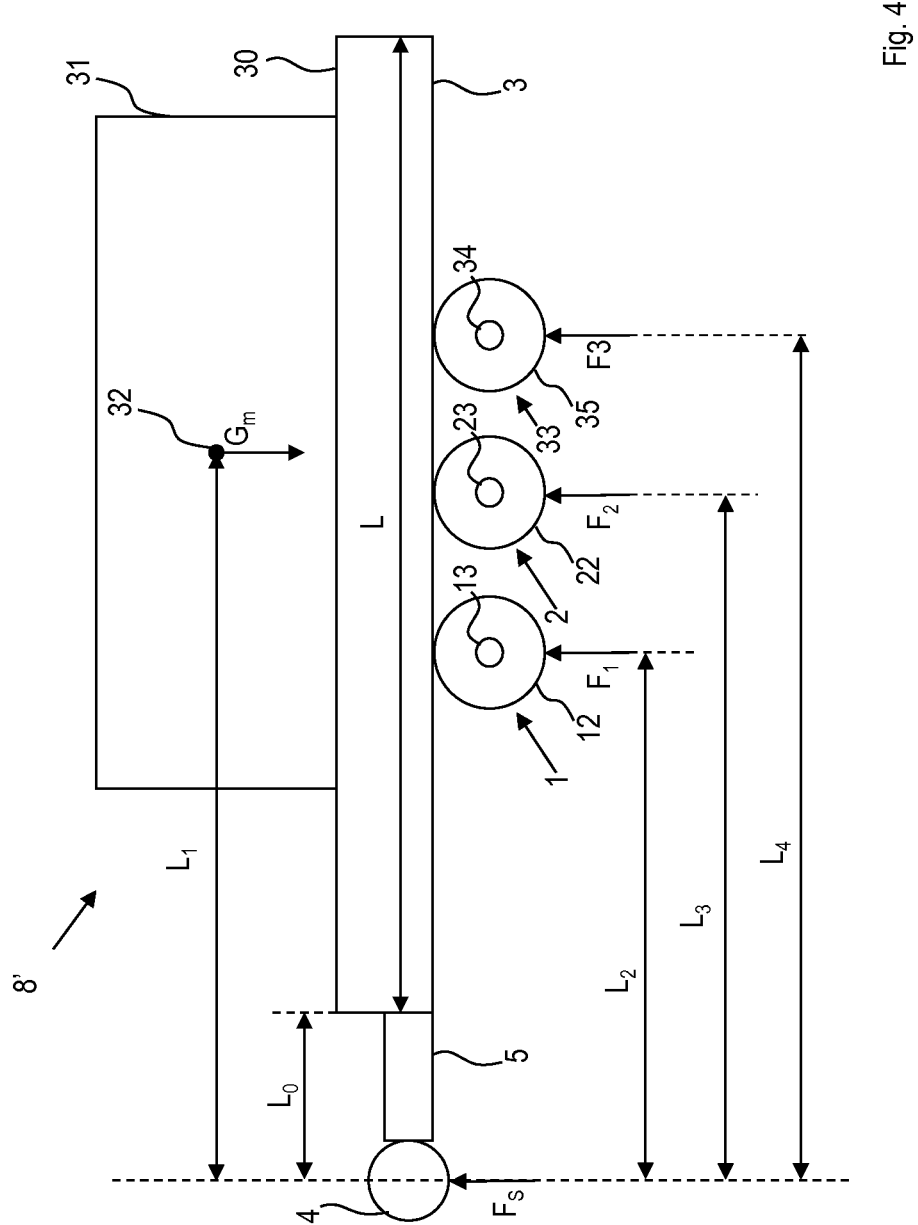
FIG. 4 is a side view of another central axle trailer according to an embodiment of the present invention.

FIG. 4 shows a central axle trailer 8' in side view with further details. Central axle trailer 8' is similar to central axle trailer 8 of FIG. 2 with the addition of a third axle 33. In particular, third axle 33 of central axle trailer 8' includes wheel 35 fastened to axle rod 34. $F_3$ is the axle load on third axle 33. $L_4$ is the spacing of the points of application of the supporting load $F_s$ and the axle load $F_3$ of third axle 33.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for adjusting a supporting load on a trailer coupling of a central axle trailer equipped with at least two axles having pneumatic suspensions, and a pneumatic suspension system including a separately adjustable pneumatic suspension circuit on each of the at least two axles, the method comprising:
    determining whether a current supporting load on the trailer coupling is outside a preselected supporting load range; and,
    when the current supporting load on the trailer coupling is outside the preselected supporting load range, altering the current supporting load by separate adjustment of a quantity of air in at least one of the separately adjustable pneumatic suspension circuits until the current supporting load is within the preselected supporting load range.

2. The method as claimed in claim 1, wherein the step of determining is based on axle loads of the at least two axles.

3. The method as claimed in claim 1, wherein separate adjustment of the quantity of air in the at least one of the pneumatic suspension circuits is automatically effected by an electronic control device by activating at least one electrically actuatable pneumatic valve device.

4. The method as claimed in claim 1, wherein at least one of the at least two axles is configured as a lifting axle, the method further comprising automatically actuating an axle lifting device when the current supporting load is outside the preselected supporting load range.

5. An electronic control device configured to adjust the current supporting load of a central axle trailer according to the method as claimed in claim 1.

6. The method as claimed in claim 1, wherein the step of altering further comprises:
    reducing the current supporting load by separate adjustment of the quantity of air in at least one of the pneumatic suspension circuits when the current supporting load exceeds the preselected supporting load range; and
    increasing the current supporting load by separate adjustment of the quantity of air in at least one of the pneumatic suspension circuits when the current supporting load is below the preselected supporting load range.

7. The method as claimed in claim 6, wherein the at least two axles include a first axle and a second axle disposed behind the first axle, the method further comprising:
    reducing an axle load of the second axle relative to an axle load of the first axle when the current supporting load exceeds the preselected supporting load range; and
    reducing the axle load of the first axle relative to the axle load of the second axle when the current supporting load is below the preselected supporting load range.

8. A pneumatic suspension system for a central axle trailer equipped with at least two axles having pneumatic suspensions, the pneumatic suspension system including separately adjustable pneumatic suspension circuits on the at least two axles, respective quantities of air in the pneumatic suspension circuits being separately adjustable to maintain a current supporting load on a trailer coupling within a preselected supporting load range.

9. The pneumatic suspension system as claimed in claim 8, further comprising an electronic control device configured to adjust a supporting load on a trailer coupling of the central axle trailer by:
    determining whether a current supporting load on the trailer coupling is outside a preselected supporting load range; and,
    when the current supporting load on the trailer coupling is outside the preselected supporting load range, altering the current supporting load by separate adjustment of a quantity of air in at least one of the separately adjustable pneumatic suspension circuits until the current supporting load is within the preselected supporting load range.

10. The pneumatic suspension system as claimed in claim 8, wherein the central axle trailer is equipped with more than two axles having pneumatic suspensions, the pneumatic suspension system having fewer separate pneumatic suspension circuits than axles, and further comprising pneumatic suspension bellows of a plurality of the more than two axles having pneumatic suspensions, the bellows being connected to form a common pneumatic suspension circuit.

11. A central axle trailer equipped with at least two axles having pneumatic suspensions, the trailer comprising the pneumatic suspension system as claimed in claim 8.

* * * * *